(12) United States Patent
Hwang et al.

(10) Patent No.: US 10,041,569 B2
(45) Date of Patent: Aug. 7, 2018

(54) PLANETARY GEAR TRAIN OF AUTOMATIC TRANSMISSION FOR VEHICLE

(71) Applicant: Hyundai Motor Company, Seoul (KR)

(72) Inventors: Seong Wook Hwang, Gunpo-si (KR); Hyun Sik Kwon, Seoul (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/333,922

(22) Filed: Oct. 25, 2016

(65) Prior Publication Data

US 2017/0167577 A1    Jun. 15, 2017

(30) Foreign Application Priority Data

Dec. 10, 2015 (KR) .................. 10-2015-0176319

(51) Int. Cl.
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS 8,303,454 B1 * 11/2012 Shim .................. F16H 3/66
475/280
8,512,197 B2    8/2013 Mellet et al.

FOREIGN PATENT DOCUMENTS

JP    2009-197927 A    9/2009
KR    10-2012-0119451 A    10/2012
KR    10-2014-0046240 A    4/2014

* cited by examiner

*Primary Examiner* — Colby M Hansen
(74) *Attorney, Agent, or Firm* — Morgan, Lewis & Bockius LLP (57) ABSTRACT

A planetary gear train of an automatic transmission for a vehicle may include an input shaft receiving torque of an engine, an output shaft outputting changed torque, a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element, a fourth planetary gear set including a tenth rotation element, an eleventh rotation element, and a twelfth rotation element, and first, second, third, fourth, fifth, sixth, and seventh rotation shafts connected to at least one of the first to twelfth rotation elements.

12 Claims, 4 Drawing Sheets

| Speed stages | C1 | C2 | C3 | C4 | B1 | B2 | B3 | Gear ratio |
|---|---|---|---|---|---|---|---|---|
| D1 | ● | | | | ● | | ● | 7.500 |
| D2 | ● | | | | | ● | ● | 4.406 |
| D3 | ● | ● | | | | | ● | 3.000 |
| D4 | | ● | | | | ● | ● | 2.063 |
| D5 | | ● | | ● | | | ● | 1.526 |
| D6 | | ● | | ● | | ● | | 1.194 |
| D7 | ● | ● | | ● | | | | 1.000 |
| D8 | ● | | | ● | | ● | | 0.898 |
| D9 | ● | | | ● | ● | | | 0.824 |
| D10 | | | | ● | ● | ● | | 0.737 |
| D11 | | | ● | ● | ● | | | 0.658 |
| REV | | | ● | | ● | | ● | -6.600 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0176319, filed Dec. 10, 2015, the entire contents of which is incorporated herein for all purposes by this reference.

BACKGROUND OF THE INVENTION

Field of the Invention

The present invention relates to an automatic transmission for a vehicle. More particularly, to a planetary gear train of an automatic transmission for a vehicle that improves power delivery performance and fuel economy by achieving eleven forward speed stages with a minimum number of constituent elements being used and improves silent driving of the vehicle by using an operation point positioned at a low engine speed.

Description of Related Art

Recent increases in oil price are triggering stiff competition in enhancing fuel consumption of a vehicle.

In this sense, research for an engine has been made to achieve weight reduction and to enhance fuel consumption by so-called downsizing and research for an automatic transmission has been made to simultaneously provide better drivability and fuel consumption by achieving more shift-stages.

However, in the automatic transmission, as the number of speed stages increase, the number of internal components (particularly, planetary gear sets) increase, and as a result, a length of the transmission increases. This may deteriorate installability and/or power flow efficiency and may increase production cost, and weight.

Therefore, in order to maximally enhance fuel consumption of an automatic transmission having more shift-stages, it is important that better efficiency is derived by less number of parts.

In this aspect, in recent years, 8-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving eleven forward speed stages and one reverse speed stage.

Additionally, various aspects of the present invention are directed to providing a planetary gear train of an automatic transmission for a vehicle having further advantages of improving silent driving of the vehicle by using operation point positioned at a low rotational speed region of an engine.

According to various aspects of the present invention, a planetary gear train of an automatic transmission for a vehicle may include an input shaft receiving torque of an engine, an output shaft outputting changed torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and first, second, third, fourth, fifth, sixth, and seventh rotation shafts connected to at least one of the first to twelfth rotation elements, in which the first rotation shaft may be selectively connectable to the input shaft, the third rotation shaft may be selectively connectable to at least one of the input shaft and a transmission housing, the fourth rotation shaft may be selectively connectable to at least one of the input shaft and the transmission housing, the fifth rotation shaft may be connected to the input shaft directly or selectively, the sixth rotation shaft may be directly connected to the output shaft, and the seventh rotation shaft may be selectively connectable to the transmission housing.

The first planetary gear set may be a single pinion planetary gear set, the first rotation element may be a first sun gear, the second rotation element may be a first planet carrier, and the third rotation element may be a first ring gear, the second planetary gear set may be a single pinion planetary gear set, the fourth rotation element may be a second sun gear, the fifth rotation element may be a second planet carrier, and the sixth rotation element may be a second ring gear, the third planetary gear set may be a single pinion planetary gear set, the seventh rotation element may be a third sun gear, the eighth rotation element may be a third planet carrier, and the ninth rotation element may be a third ring gear, and the fourth planetary gear set may be a single pinion planetary gear set, the tenth rotation element may be a fourth sun gear, the eleventh rotation element may be a fourth planet carrier, and the twelfth rotation element may be a fourth ring gear.

The first rotation shaft may directly connect the first rotation element with the fourth rotation element, the second rotation shaft may directly connect the fifth rotation element with the seventh rotation element and the tenth rotation element, the third rotation shaft may directly connect the second rotation element with the sixth rotation element, the fourth rotation shaft may be directly connected to the third rotation element, the fifth rotation shaft may be directly connected to the eleventh rotation element and may be directly connected to the input shaft, the sixth rotation shaft may be directly connected to the eighth rotation element and may be selectively connectable to the twelfth rotation element, and the seventh rotation shaft may be directly connected to the ninth rotation element.

The planetary gear train may further include a first clutch selectively connecting the first rotation element with the input shaft, a second clutch selectively connecting the second rotation element with the input shaft, a third clutch selectively connecting the third rotation element with the input shaft, a fourth clutch selectively connecting the eighth rotation element with the twelfth rotation element, a first brake selectively connecting the sixth rotation element with the transmission housing, a second brake selectively connecting the third rotation element with the transmission housing, and a third brake selectively connecting the ninth rotation element with the transmission housing.

A first forward speed stage may be achieved by operation of the first clutch and the first and third brakes, a second forward speed stage may be achieved by operation of the first clutch and the second and third brakes, a third forward speed stage may be achieved by operation of the first and second clutches and the third brake, a fourth forward speed stage may be achieved by operation of the second clutch and the second and third brakes, a fifth forward speed stage may be achieved by operation of the second and fourth clutches and the third brake, a sixth forward speed stage may be achieved by operation of the second and fourth clutches and the second brake, a seventh forward speed stage may be achieved by operation of the first, second, and fourth clutches, an eighth forward speed stage may be achieved by operation of the first and fourth clutches and the second brake, a ninth forward speed stage may be achieved by operation of the first and fourth clutches and the first brake, a tenth forward speed stage may be achieved by operation of the fourth clutch and the first and second brakes, an eleventh forward speed stage may be achieved by operation of the third and fourth clutches and the first brake, and a reverse speed stage may be achieved by operation of the third clutch and the first and third brakes.

The first rotation shaft may directly connect the first rotation element with the fourth rotation element, the second rotation shaft may directly connect the fifth rotation element with the seventh rotation element and may be selectively connectable to the tenth rotation element, the third rotation shaft may directly connect the second rotation element with the sixth rotation element, the fourth rotation shaft may be directly connected to the third rotation element, the fifth rotation shaft may be directly connected to the eleventh rotation element and may be directly connected to the input shaft, the sixth rotation shaft directly connects the eighth rotation element with the twelfth rotation element, and the seventh rotation shaft may be directly connected to the ninth rotation element.

The planetary gear train my further include a first clutch selectively connecting the first rotation element with the input shaft, a second clutch selectively connecting the second rotation element with the input shaft, a third clutch selectively connecting the third rotation element with the input shaft, a fourth clutch selectively connecting the seventh rotation element with the tenth rotation element, a first brake selectively connecting the sixth rotation element with the transmission housing, a second brake selectively connecting the third rotation element with the transmission housing, and a third brake selectively connecting the ninth rotation element with the transmission housing.

The planetary gear train may include a first clutch selectively connecting the first rotation element with the input shaft, a second clutch selectively connecting the second rotation element with the input shaft, a third clutch selectively connecting the third rotation element with the input shaft, a fourth clutch selectively connecting the input shaft with the eleventh rotation element, a first brake selectively connecting the sixth rotation element with the transmission housing, a second brake selectively connecting the third rotation element with the transmission housing, and a third brake selectively connecting the ninth rotation element with the transmission housing.

The planetary gear train according to various embodiments of the present invention may achieve eleven forward speed stages and one reverse speed stage by combining four planetary gear sets being simple planetary gear sets with seven control elements.

In addition, the planetary gear train according to various embodiments of the present invention may improve silent driving because speed stages suitable to a rotational speed of the engine is achieved due to multiple-speed stages of the automatic transmission.

In addition, the planetary gear train according to various embodiments of the present invention may maximize driving efficiency of the engine and may improve power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
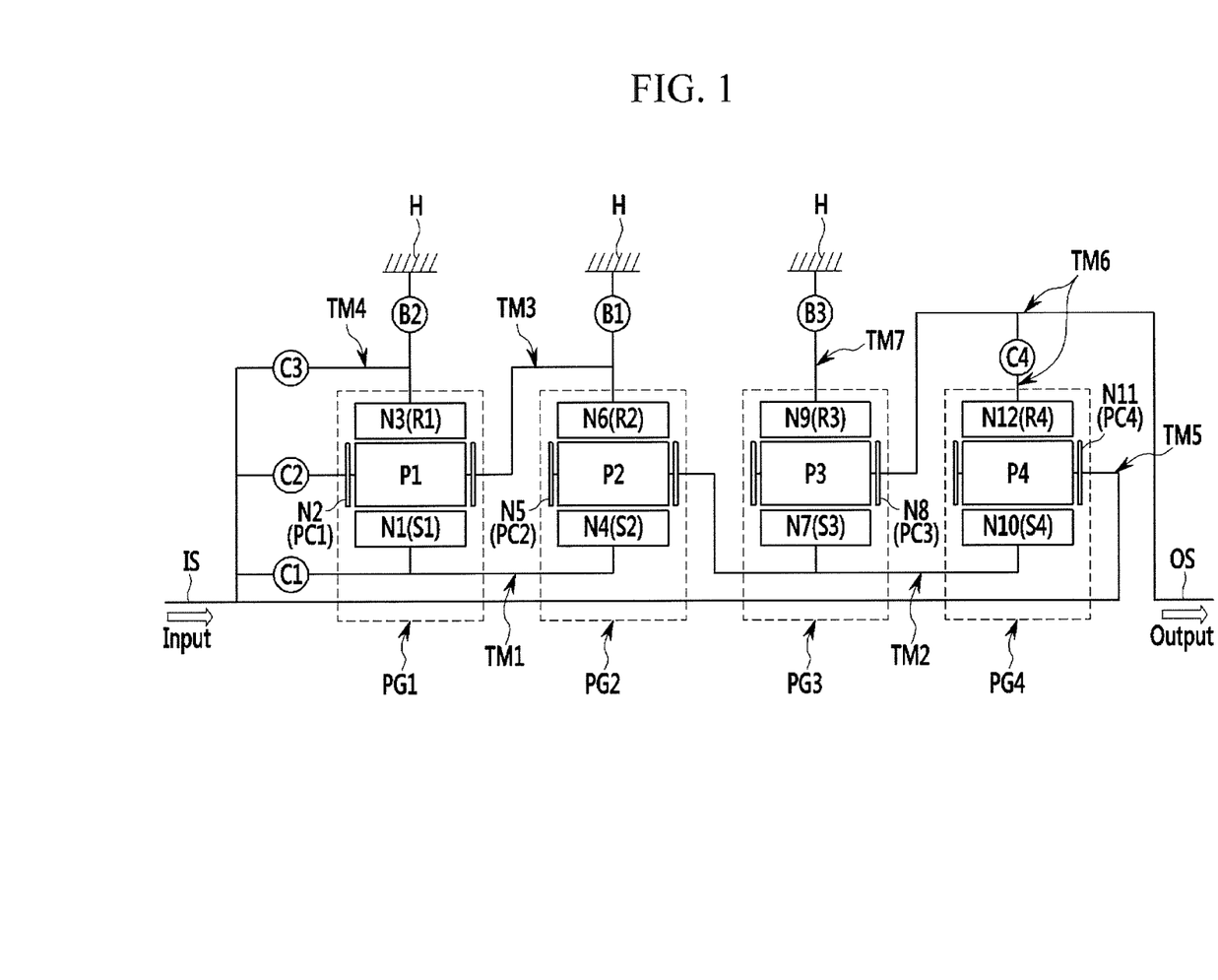
FIG. 1 is a schematic diagram of a planetary gear train according to various embodiments of the present invention.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, seven rotation shafts TM1 to TM7 connected to at least one of rotation elements of the first, second, third, and fourth planetary gear sets PG1, PG2, PG3, and PG4, seven control elements C1 to C4 and B1 to B3, and a transmission housing H.

Torque input from the input shaft IS is changed by cooperation of the first, second, third, and fourth planetary gear sets PG1, PG2, PG3, and PG4 and the changed torque is output through the output shaft OS.

The planetary gear sets are disposed in the order of first, second, third and fourth planetary gear sets PG1, PG2, PG3 and PG4 from an engine side.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected to the fourth rotation element N4, the second rotation element N2 is directly connected to the sixth rotation element N6, the fifth rotation element N5 is directly connected to the seventh rotation element N7 and the tenth rotation element N10, and the eighth rotation element N8 is selectively connectable to the twelfth rotation element N12 such that the first, second, third, and fourth planetary gear sets PG1, PG2, PG3, and PG4 include seven rotation shafts TM1 to TM7.

The seven rotation shafts TM1 to TM7 will be described in detail.

The first rotation shaft TM1 directly connects the first rotation element N1 (first sun gear S1) with the fourth rotation element N4 (second sun gear S2) and is selectively connectable to the input shaft IS so as to be operated as a selective input element.

The second rotation shaft TM2 directly connects the fifth rotation element N5 (second planet carrier PC2) with the seventh rotation element N7 (third sun gear S3) and the tenth rotation element N10 (fourth sun gear S4).

The third rotation shaft TM3 directly connects the second rotation element N2 (first planet carrier PC1) with the sixth rotation element N6 (second ring gear R2), is selectively connectable to the input shaft IS, and is selectively connectable to the transmission housing H.

The fourth rotation shaft TM4 is directly connected to the third rotation element N3 (first ring gear R1), is selectively connectable to the input shaft IS, and is selectively connectable to the transmission housing H.

The fifth rotation shaft TM5 is directly connected to the eleventh rotation element N11 (fourth planet carrier PC4) and is directly connected to the input shaft IS so as to be continuously operated as an input element.

The sixth rotation shaft TM6 is directly connected to the eighth rotation element N8 (third planet carrier PC3) or selectively connects the eighth rotation element N8 with the twelfth rotation element N12 (fourth ring gear R4), and is directly connected to the output shaft OS so as to be continuously operated as an output element.

The seventh rotation shaft TM7 is directly connected to the ninth rotation element N9 (third ring gear R3) and is selectively connectable to the transmission housing H so as to be operated as a selective fixed element.

The sixth rotation shaft TM6 is directly connected to the eighth rotation element N8 at a first forward speed stage to a fourth forward speed stage and a reverse speed stage, and connects the eighth rotation element N8 with the twelfth rotation element N12 at the other speed stages.

In addition, four clutches C1, C2, C3, and C4 that are control elements are disposed at portions at which two rotation shafts among the rotation shafts TM1 to TM7 are selectively connectable to each other.

In addition, three brakes B1, B2, and B3 that are control elements are disposed at portions at which at least one rotation shaft among the rotation shafts TM1 to TM7 is selectively connectable to the transmission housing H.

Arrangements of the seven control elements C1 to C4 and B1 to B3 are described in detail.

The first clutch C1 is disposed between the input shaft IS and the first rotation shaft TM1 and selectively connects the input shaft IS with the first rotation shaft TM1.

The second clutch C2 is disposed between the input shaft IS and the third rotation shaft TM3 and selectively connects the input shaft IS with the third rotation shaft TM3.

The third clutch C3 is disposed between the input shaft IS and the fourth rotation shaft TM4 and selectively connects the input shaft IS with the fourth rotation shaft TM4.

The fourth clutch C4 is disposed between the eighth rotation element N8 and the twelfth rotation element N12 and selectively connects the eighth rotation element N8 with the twelfth rotation element N12.

The first brake B1 is disposed between the third rotation shaft TM3 and the transmission housing H and causes the third rotation shaft TM3 to be operated as a selective fixed element.

The second brake B2 is disposed between the fourth rotation shaft TM4 and the transmission housing H and causes the fourth rotation shaft TM4 to be operated as a selective fixed element.

The third brake B3 is disposed between the seventh rotation shaft TM7 and the transmission housing H and causes the seventh rotation shaft TM7 to be operated as a selective fixed element.

The control elements including the first, second, third, and fourth clutches C1, C2, C3, and C4 and the first, second, and third brakes B1, B2, and B3 may be multi-plates friction elements of wet type that are operated by hydraulic pressure.

Figure 2:
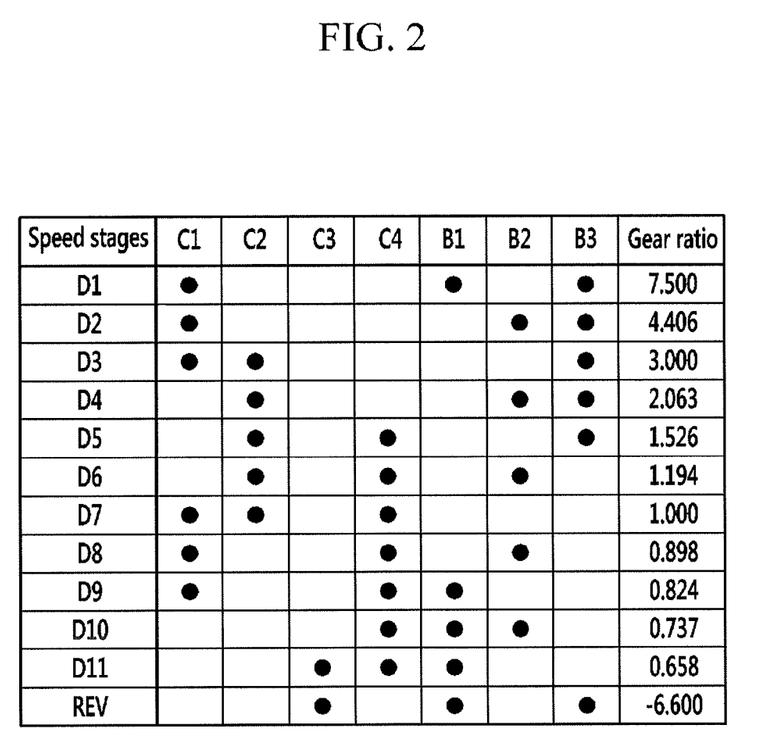
FIG. 2 is an operation chart of control elements at each speed stage in the planetary gear train according to various embodiments of the present invention.

FIG. 2 is an operation chart of control elements at each speed stage in a planetary gear train according to various embodiments of the present invention.

As shown in FIG. 2, three control elements are operated at each speed stage in the planetary gear train according to various embodiments of the present invention.

The first clutch C1 and the first and third brakes B1 and B3 are operated at a first forward speed stage D1.

In a state that the input shaft IS is connected to the first rotation shaft TM1 by operation of the first clutch C1, torque of the input shaft IS is input to the first rotation shaft TM1 and the fifth rotation shaft TM5. In addition, the third rotation shaft TM3 and the seventh rotation shaft TM7 are operated as the fixed elements by operation of the first and third brakes B1 and B3. Therefore, the torque of the input shaft IS is shifted into the first forward speed stage, and the first forward speed stage is output through the output shaft OS connected to the sixth rotation shaft TM6.

The first clutch C1 and the second and third brakes B2 and B3 are operated at a second forward speed stage D2.

In a state that the input shaft IS is connected to the first rotation shaft TM1 by operation of the first clutch C1, the torque of the input shaft IS is input to the first rotation shaft TM1 and the fifth rotation shaft TM5. In addition, the fourth rotation shaft TM4 and the seventh rotation shaft TM7 are operated as the fixed elements by operation of the second and third brakes B2 and B3. Therefore, the torque of the input shaft IS is shifted into the second forward speed stage, and the second forward speed stage is output through the output shaft OS connected to the sixth rotation shaft TM6.

The first and second clutches C1 and C2 and the third brake B3 are operated at a third forward speed stage D3.

In a state that the input shaft IS is connected to the first rotation shaft TM1 by operation of the first clutch C1 and is connected to the third rotation shaft TM3 by operation of the second clutch C2, the torque of the input shaft IS is input to the first, third, and fifth rotation shafts TM1, TM3, and TM5. In addition, the seventh rotation shaft TM7 is operated as the fixed element by operation of the third brake B3. Therefore, the torque of the input shaft IS is shifted into the third forward speed stage, and the third forward speed stage is output through the output shaft OS connected to the sixth rotation shaft TM6.

The second clutch C2 and the second and third brakes B2 and B3 are operated at a fourth forward speed stage D4.

In a state that the input shaft IS is connected to the third rotation shaft TM3 by operation of the second clutch C2, the torque of the input shaft IS is input to the first rotation shaft TM1 and the fifth rotation shaft TM5. In addition, the fourth rotation shaft TM4 and the seventh rotation shaft TM7 are operated as the fixed elements by operation of the second and third brakes B2 and B3. Therefore, the torque of the input shaft IS is shifted into the fourth forward speed stage, and the fourth forward speed stage is output through the output shaft OS connected to the sixth rotation shaft TM6.

The second and fourth clutches C2 and C4 and the third brake B3 are operated at a fifth forward speed stage D5.

In a state that the input shaft IS is connected to the third rotation shaft TM3 by operation of the second clutch C2 and the sixth rotation shaft TM6 connects the eighth rotation element N8 with the twelfth rotation element N12 by operation of the fourth clutch C4, the torque of the input shaft IS is input to the third and fifth rotation shafts TM3 and TM5. In addition, the seventh rotation shaft TM7 is operated as the fixed element by operation of the third brake B3. Therefore, the torque of the input shaft IS is shifted into the fifth forward speed stage, and the fifth forward speed stage is output through the output shaft OS connected to the sixth rotation shaft TM6.

The second and fourth clutches C2 and C4 and the second brake B2 operated at a sixth forward speed stage D6.

In a state that the input shaft IS is connected to the third rotation shaft TM3 by operation of the second clutch C2 and the sixth rotation shaft TM6 connects the eighth rotation element N8 with the twelfth rotation element N12 by operation of the fourth clutch C4, the torque of the input shaft IS is input to the third and fifth rotation shafts TM3 and TM5. In addition, the fourth rotation shaft TM4 is operated as the fixed element by operation of the second brake B2. Therefore, the torque of the input shaft IS is shifted into the sixth forward speed stage, and the sixth forward speed stage is output through the output shaft OS connected to the sixth rotation shaft TM6.

The first, second, and fourth clutches C1, C2, and C4 are operated at a seventh forward speed stage D7.

In a state that the input shaft IS is connected to the first rotation shaft TM1 by operation of the first clutch C1, the input shaft IS is connected to the third rotation shaft TM3 by operation of the second clutch C2, and the sixth rotation shaft TM6 connects the eighth rotation element N8 with the twelfth rotation element N12 by operation of the fourth clutch C4, the torque of the input shaft IS is input to the first, third, and fifth rotation shafts TM1, TM3, and TM5. Therefore, the torque of the input shaft IS is shifted into the seventh forward speed stage, and the seventh forward speed stage is output through the output shaft OS connected to the sixth rotation shaft TM6. At the seventh forward speed stage, the same rotation speed as the input shaft IS is output.

The first and fourth clutches C1 and C4 and the second brake B2 are operated at an eighth forward speed stage D8.

In a state that the input shaft IS is connected to the first rotation shaft TM1 by operation of the first clutch C1 and the sixth rotation shaft TM6 connects the eighth rotation element N8 with the twelfth rotation element N12 by operation of the fourth clutch C4, the torque of the input shaft IS is input to the first and fifth rotation shafts TM1 and TM5. In addition, the fourth rotation shaft TM4 is operated as the fixed element by operation of the second brake B2. Therefore, the torque of the input shaft IS is shifted into the eighth forward speed stage, and the eighth forward speed stage is output through the output shaft OS connected to the sixth rotation shaft TM6.

The first and fourth clutches C1 and C4 and the first brake B1 are operated at a ninth forward speed stage D9.

In a state that the input shaft IS is connected to the first rotation shaft TM1 by operation of the first clutch C1 and the sixth rotation shaft TM6 connects the eighth rotation element N8 with the twelfth rotation element N12 by operation of the fourth clutch C4, the torque of the input shaft IS is input to the first and fifth rotation shafts TM1 and TM5. In addition, the third rotation shaft TM3 is operated as the fixed element by operation of the first brake B1. Therefore, the torque of the input shaft IS is shifted into the eighth forward speed stage, and the eighth forward speed stage is output through the output shaft OS connected to the sixth rotation shaft TM6.

The fourth clutch C4 and the first and second brakes B2 and B3 are operated at a tenth forward speed stage D10.

In a state that the sixth rotation shaft TM6 connects the eighth rotation element N8 with the twelfth rotation element N12 by operation of the fourth clutch C4, the torque of the input shaft IS is input to the fifth rotation shaft TM5. In addition, the third rotation shaft TM3 and the fourth rotation shaft TM4 are operated as the fixed elements by operation of the first and second brakes B1 and B2. Therefore, the torque of the input shaft IS is shifted into the tenth forward speed stage, and the tenth forward speed stage is output through the output shaft OS connected to the sixth rotation shaft TM6.

The third and fourth clutches C3 and C4 and the first brake B1 are operated at an eleventh forward speed stage D11.

In a state that the input shaft IS is connected to the fourth rotation shaft TM4 by operation of the third clutch C3 and the sixth rotation shaft TM6 connects the eighth rotation element N8 with the twelfth rotation element N12 by operation of the fourth clutch C4, the torque of the input shaft IS is input to the fourth and fifth rotation shafts TM4 and TM5. In addition, the third rotation shaft TM3 is operated as the fixed element by operation of the first brake B1. Therefore, the torque of the input shaft IS is shifted into the eleventh forward speed stage, and the eleventh forward speed stage is output through the output shaft OS connected to the sixth rotation shaft TM6.

The third clutch C3 and the first and third brakes B1 and B3 are operated at a reverse speed stage REV.

In a state that the input shaft IS is connected to the fourth rotation shaft TM4 by operation of the third clutch C3, the torque of the input shaft IS is input to the first rotation shaft TM1 and the fifth rotation shaft TM5. In addition, the third rotation shaft TM3 and the seventh rotation shaft TM7 are operated as the fixed elements by operation of the first and third brakes B1 and B3. Therefore, the torque of the input shaft IS is shifted into the reverse speed stage, and the reverse speed stage is output through the output shaft OS connected to the sixth rotation shaft TM6.

The planetary gear train according to various embodiments of the present invention may achieve eleven forward speed stages and one reverse speed stage by combining four planetary gear sets PG1, PG2, PG3, and PG4 with four clutches C1, C2, C3, and C4 and three brakes B1, B2, and B3.

In addition, the planetary gear train according various embodiments of the present invention may improve silent driving because speed stages suitable to a rotational speed of the engine is achieved due to multiple-speed stages of the automatic transmission.

In addition, the planetary gear train according to various embodiments of the present invention may maximize driving efficiency of the engine and may improve power delivery performance and fuel consumption.

Figure 3:
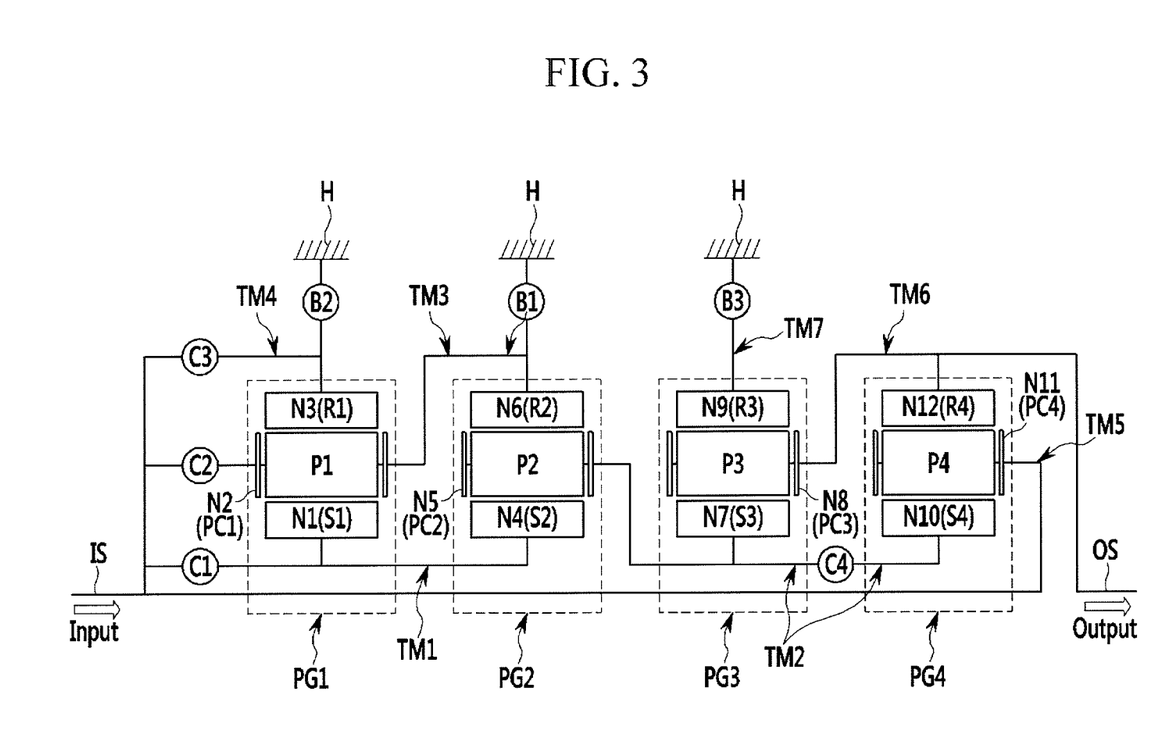
FIG. 3 is a schematic diagram of a planetary gear train according to various embodiments of the present invention.

FIG. 3 is a schematic diagram of a planetary gear train according to various embodiments of the present invention.

Referring to FIG. 3, the fourth clutch C4 is disposed between the eighth rotation element N8 and the twelfth rotation element N12 in various embodiments of FIG. 1, but the fourth clutch C4 is disposed between the seventh rotation element N7 and the tenth rotation element N10 in various embodiments of FIG. 3.

The seven rotation shafts TM1 to TM7 will be described in detail.

The first rotation shaft TM1 directly connects the first rotation element N1 (first sun gear S1) with the fourth rotation element N4 (second sun gear S2) and is selectively connectable to the input shaft IS so as to be operated as a selective input element.

The second rotation shaft TM2 directly connects the fifth rotation element N5 (second planet carrier PC2) with the seventh rotation element N7 (third sun gear S3) and is selectively connectable to the tenth rotation element N10 (fourth sun gear S4).

The third rotation shaft TM3 directly connects the second rotation element N2 (first planet carrier PC1) with the sixth rotation element N6 (second ring gear R2), is selectively connectable to the input shaft IS, and is selectively connectable to the transmission housing H.

The fourth rotation shaft TM4 is directly connected to the third rotation element N3 (first ring gear R1), is selectively connectable to the input shaft IS, and is selectively connectable to the transmission housing H.

The fifth rotation shaft TM5 is directly connected to the eleventh rotation element N11 (fourth planet carrier PC4) and is directly connected to the input shaft IS so as to be continuously operated as an input element.

The sixth rotation shaft TM6 directly connects the eighth rotation element N8 (third planet carrier PC3) with the twelfth rotation element N12 (fourth ring gear R4) and is directly connected to the output shaft OS so as to be continuously operated as an output element.

The seventh rotation shaft TM7 is directly connected to the ninth rotation element N9 (third ring gear R3) and is selectively connectable to the transmission housing H so as to be operated as a selective fixed element.

The second rotation shaft TM2 directly connects the fifth rotation element N5 with the seventh rotation element N7 at the first forward speed stage to the fourth forward speed stage and the reverse speed stage, and connects the fifth rotation element N5 with the seventh rotation element N7 and the tenth rotation element N10 at the other speed stages.

Seven control elements are disposed at portions where at least one rotation shaft and another rotation shaft are selectively connectable to each other and portions where at least one rotation shaft and the transmission housing are selectively connectable to each other.

Arrangements of the seven control elements C1 to C4 and B1 to B3 are described in detail.

The first clutch C1 is disposed between the input shaft IS and the first rotation shaft TM1 and selectively connects the input shaft IS with the first rotation shaft TM1.

The second clutch C2 is disposed between the input shaft IS and the third rotation shaft TM3 and selectively connects the input shaft IS with the third rotation shaft TM3.

The third clutch C3 is disposed between the input shaft IS and the fourth rotation shaft TM4 and selectively connects the input shaft IS with the fourth rotation shaft TM4.

The fourth clutch C1 is disposed between the seventh rotation element N7 and the tenth rotation element N10 and selectively connects the seventh rotation element N7 with the tenth rotation element N10.

The first brake B1 is disposed between the third rotation shaft TM3 and the transmission housing H and causes the third rotation shaft TM3 to be operated as a selective fixed element.

The second brake B2 is disposed between the fourth rotation shaft TM4 and the transmission housing H and causes the fourth rotation shaft TM4 to be operated as a selective fixed element.

The third brake B3 is disposed between the seventh rotation shaft TM7 and the transmission housing H and causes the seventh rotation shaft TM7 to be operated as a selective fixed element.

Since shifting processes according to the various embodiments of FIG. 3 are the same as those according to the various embodiments of FIG. 1, detailed description thereof will be omitted.

Figure 4:
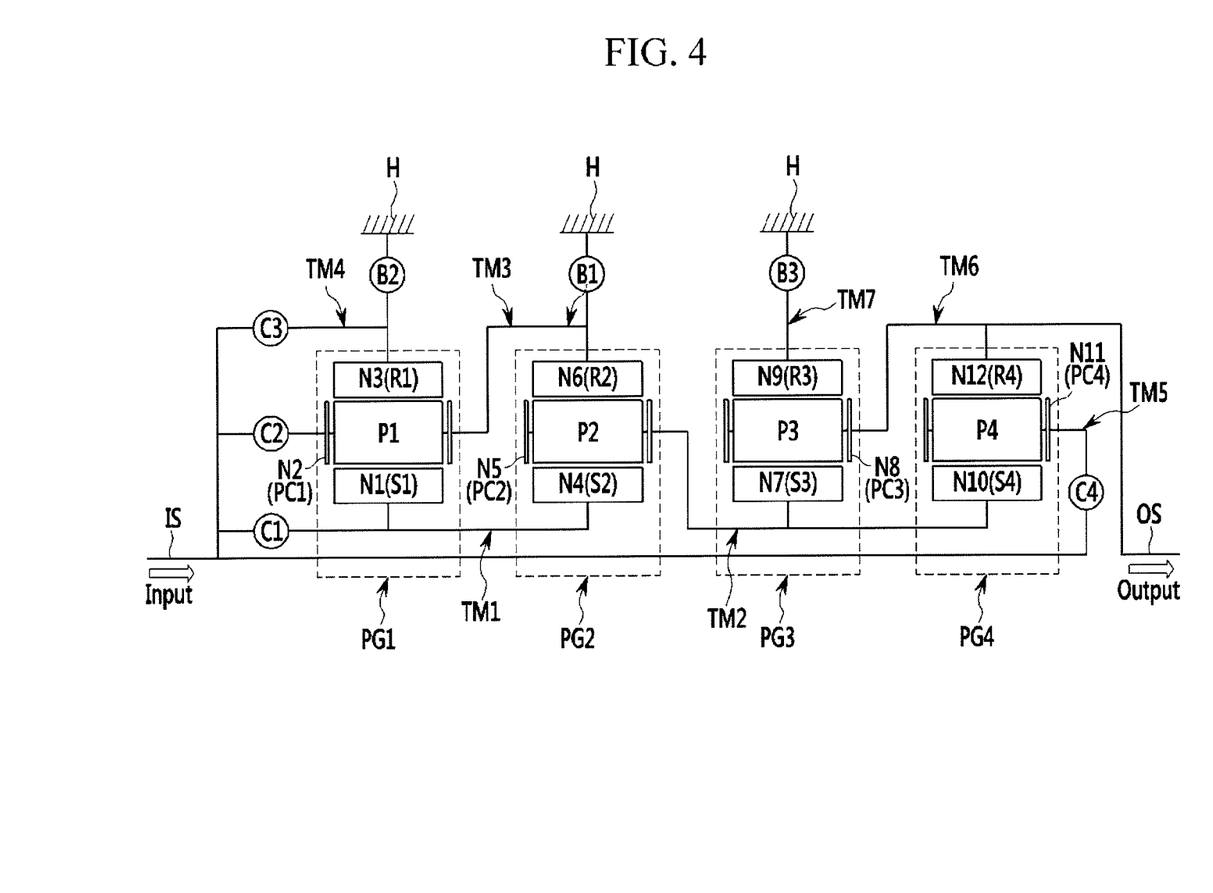
FIG. 4 is a schematic diagram of a planetary gear train according to various embodiments of the present invention.

FIG. 4 is a schematic diagram of a planetary gear train according to various embodiments of the present invention.

Referring to FIG. 4, the fourth clutch C4 is disposed between the eighth rotation element N8 and the twelfth rotation element N12 in the various embodiments of FIG. 1, but the fourth clutch C4 is disposed between the input shaft IS and the twelfth rotation element N12 in the various embodiments of FIG. 4.

The seven rotation shafts TM1 to TM7 will be described in detail.

The first rotation shaft TM1 directly connects the first rotation element N1 (first sun gear S1) with the fourth rotation element N4 (second sun gear S2) and is selectively connectable to the input shaft IS so as to be operated as a selective input element.

The second rotation shaft TM2 directly connects the fifth rotation element N5 (second planet carrier PC2) with the seventh rotation element N7 (third sun gear S3) and the tenth rotation element N10 (fourth sun gear S4).

The third rotation shaft TM3 directly connects the second rotation element N2 (first planet carrier PC1) with the sixth rotation element N6 (second ring gear R2), is selectively connectable to the input shaft IS, and is selectively connectable to the transmission housing H.

The fourth rotation shaft TM4 is directly connected to the third rotation element N3 (first ring gear R1), is selectively connectable to the input shaft IS, and is selectively connectable to the transmission housing H.

The fifth rotation shaft TM5 is directly connected to the eleventh rotation element N11 (fourth planet carrier PC4) and is selectively connectable to the input shaft IS so as to be operated as a selective input element.

The sixth rotation shaft TM6 directly connects the eighth rotation element N8 (third planet carrier PC3) with the twelfth rotation element N12 (fourth ring gear R4) and is directly connected to the output shaft OS so as to be continuously operated as an output element.

The seventh rotation shaft TM7 is directly connected to the ninth rotation element N9 (third ring gear R3) and is selectively connectable to the transmission housing H so as to be operated as a selective fixed element.

The fifth rotation shaft TM5 does not connects the eleventh rotation element with the input shaft at the first forward speed stage to the fourth forward speed stage and the reverse speed stage, and connects the eleventh rotation element with the input shaft at the other speed stages.

Seven control elements are disposed at portions where at least one rotation shaft and another rotation shaft are selectively connectable to each other and portions where at least one rotation shaft and the transmission housing are selectively connectable to each other.

Arrangements of the seven control elements C1 to C4 and B1 to B3 are described in detail.

The first clutch C1 is disposed between the input shaft IS and the first rotation shaft TM1 and selectively connects the input shaft IS with the first rotation shaft TM1.

The second clutch C2 is disposed between the input shaft IS and the third rotation shaft TM3 and selectively connects the input shaft IS with the third rotation shaft TM3.

The third clutch C3 is disposed between the input shaft IS and the fourth rotation shaft TM4 and selectively connects the input shaft IS with the fourth rotation shaft TM4.

The fourth clutch C1 is disposed between the input shaft IS and the eleventh rotation element N11 and selectively connects the input shaft IS with the eleventh rotation element N11.

The first brake B1 is disposed between the third rotation shaft TM3 and the transmission housing H and causes the third rotation shaft TM3 to be operated as a selective fixed element.

The second brake B2 is disposed between the fourth rotation shaft TM4 and the transmission housing H and causes the fourth rotation shaft TM4 to be operated as a selective fixed element.

The third brake B3 is disposed between the seventh rotation shaft TM7 and the transmission housing H and causes the seventh rotation shaft TM7 to be operated as a selective fixed element.

Since shifting processes according to the various embodiments of FIG. 4 are the same as those according to the various embodiments of FIG. 1, detailed description thereof will be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element; and
   first, second, third, fourth, fifth, sixth, and seventh rotation shafts connected to at least one of the first to twelfth rotation elements,
   wherein the first rotation shaft is selectively connectable to the input shaft,
   the third rotation shaft is selectively connectable to the input shaft and a transmission housing,
   the fourth rotation shaft is selectively connectable to the input shaft and the transmission housing,
   the fifth rotation shaft is connected to the input shaft directly or selectively,
   the sixth rotation shaft is directly connected to the output shaft, and
   the seventh rotation shaft is selectively connectable to the transmission housing,
   wherein the first rotation shaft directly connects the first rotation element with the fourth rotation element,
   the second rotation shaft directly connects the fifth rotation element with the seventh rotation element and the tenth rotation element,
   the third rotation shaft directly connects the second rotation element with the sixth rotation element,
   the fourth rotation shaft is directly connected to the third rotation element, the fifth rotation shaft is directly connected to the eleventh rotation element and is directly connected to the input shaft, the sixth rotation shaft is directly connected to the eighth rotation element and is selectively connectable to the twelfth rotation element, and the seventh rotation shaft is directly connected to the ninth rotation element.

2. The planetary gear train of claim 1, wherein the first planetary gear set is a single pinion planetary gear set, the first rotation element is a first sun gear, the second rotation element is a first planet carrier, and the third rotation element is a first ring gear;

the second planetary gear set is a single pinion planetary gear set, the fourth rotation element is a second sun gear, the fifth rotation element is a second planet carrier, and the sixth rotation element is a second ring gear;

the third planetary gear set is a single pinion planetary gear set, the seventh rotation element is a third sun gear, the eighth rotation element is a third planet carrier, and the ninth rotation element is a third ring gear; and the fourth planetary gear set is a single pinion planetary gear set, the tenth rotation element is a fourth sun gear, the eleventh rotation element is a fourth planet carrier, and the twelfth rotation element is a fourth ring gear.

3. The planetary gear train of claim 1, further comprising:

a first clutch selectively connecting the first rotation element with the input shaft;

a second clutch selectively connecting the second rotation element with the input shaft;

a third clutch selectively connecting the third rotation element with the input shaft;

a fourth clutch selectively connecting the eighth rotation element with the twelfth rotation element;

a first brake selectively connecting the sixth rotation element with the transmission housing;

a second brake selectively connecting the third rotation element with the transmission housing; and a third brake selectively connecting the ninth rotation element with the transmission housing.

4. The planetary gear train of claim 3, wherein a first forward speed is achieved by operation of the first clutch and the first and third brakes, a second forward speed is achieved by operation of the first clutch and the second and third brakes, a third forward speed is achieved by operation of the first clutch and the second clutch and the third brake, a fourth forward speed is achieved by operation of the second clutch and the second and third brakes, a fifth forward speed is achieved by operation of the second and fourth clutches and the third brake, a sixth forward speed is achieved by operation of the second and fourth clutches and the second brake, a seventh forward speed is achieved by operation of the first, second, and fourth clutches, an eighth forward speed is achieved by operation of the first and fourth clutches and the second brake, a ninth forward speed is achieved by operation of the first and fourth clutches and the first brake, a tenth forward speed is achieved by operation of the fourth clutch and the first and second brakes, an eleventh forward speed is achieved by operation of the third and fourth clutches and the first brake, and a reverse speed is achieved by operation of the third clutch and the first and third brakes.

5. A planetary gear train of an automatic transmission for a vehicle comprising:

an input shaft receiving torque of an engine;

an output shaft outputting changed torque;

a first planetary gear set including a first rotation element, a second rotation element, and a third rotation element;

a second planetary gear set including a fourth rotation element, a fifth rotation element, and a sixth rotation element;

a third planetary gear set including a seventh rotation element, an eighth rotation element, and a ninth rotation element;

a fourth planetary gear set including a tenth rotation element, an eleventh rotation element, and a twelfth rotation element; and first, second, third, fourth, fifth, sixth, and seventh rotation shafts connected to at least one of the first to twelfth rotation elements, wherein the first rotation shaft is selectively connectable to the input shaft, the third rotation shaft is selectively connectable to the input shaft and a transmission housing, the fourth rotation shaft is selectively connectable to the input shaft and the transmission housing, the fifth rotation shaft is connected to the input shaft directly or selectively, the sixth rotation shaft is directly connected to the output shaft, and the seventh rotation shaft is selectively connectable to the transmission housing, wherein the first rotation shaft directly connects the first rotation element with the fourth rotation element, the second rotation shaft directly connects the fifth rotation element with the seventh rotation element and is selectively connectable to the tenth rotation element, the third rotation shaft directly connects the second rotation element with the sixth rotation element, the fourth rotation shaft is directly connected to the third rotation element, the fifth rotation shaft is directly connected to the eleventh rotation element and is directly connected to the input shaft, the sixth rotation shaft directly connects the eighth rotation element with the twelfth rotation element, and the seventh rotation shaft is directly connected to the ninth rotation element.

6. The planetary gear train of claim 5, further comprising:

a first clutch selectively connecting the first rotation element with the input shaft;

a second clutch selectively connecting the second rotation element with the input shaft;

a third clutch selectively connecting the third rotation element with the input shaft;

a fourth clutch selectively connecting the seventh rotation element with the tenth rotation element;

a first brake selectively connecting the sixth rotation element with the transmission housing;

a second brake selectively connecting the third rotation element with the transmission housing; and a third brake selectively connecting the ninth rotation element with the transmission housing.

7. The planetary gear train of claim 6, wherein a first forward speed is achieved by operation of the first clutch and the first and third brakes, a second forward speed is achieved by operation of the first clutch and the second and third brakes, a third forward speed is achieved by operation of the first clutch and the second clutch and the third brake,
a fourth forward speed is achieved by operation of the second clutch and the second and third brakes,
a fifth forward speed is achieved by operation of the second and fourth clutches and the third brake,
a sixth forward speed is achieved by operation of the second and fourth clutches and the second brake,
a seventh forward speed is achieved by operation of the first, second, and fourth clutches,
an eighth forward speed is achieved by operation of the first and fourth clutches and the second brake,
a ninth forward speed is achieved by operation of the first and fourth clutches and the first brake,
a tenth forward speed is achieved by operation of the fourth clutch and the first and second brakes,
an eleventh forward speed is achieved by operation of the third and fourth clutches and the first brake, and
a reverse speed is achieved by operation of the third clutch and the first and third brakes.

8. The planetary gear train of claim 5, wherein
the first planetary gear set is a single pinion planetary gear set, the first rotation element is a first sun gear, the second rotation element is a first planet carrier, and the third rotation element is a first ring gear;
the second planetary gear set is a single pinion planetary gear set, the fourth rotation element is a second sun gear, the fifth rotation element is a second planet carrier, and the sixth rotation element is a second ring gear;
the third planetary gear set is a single pinion planetary gear set, the seventh rotation element is a third sun gear, the eighth rotation element is a third planet carrier, and the ninth rotation element is a third ring gear; and
the fourth planetary gear set is a single pinion planetary gear set, the tenth rotation element is a fourth sun gear, the eleventh rotation element is a fourth planet carrier, and the twelfth rotation element is a fourth ring gear.

9. A planetary gear train of an automatic transmission for a vehicle comprising:
an input shaft receiving torque of an engine;
an output shaft outputting changed torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element; and
first, second, third, fourth, fifth, sixth, and seventh rotation shafts connected to at least one of the first to twelfth rotation elements,
wherein the first rotation shaft is selectively connectable to the input shaft,
the third rotation shaft is selectively connectable to the input shaft and a transmission housing,
the fourth rotation shaft is selectively connectable to the input shaft and the transmission housing,
the fifth rotation shaft is connected to the input shaft directly or selectively,
the sixth rotation shaft is directly connected to the output shaft, and
the seventh rotation shaft is selectively connectable to the transmission housing,
wherein the first rotation shaft directly connects the first rotation element with the fourth rotation element,
the second rotation shaft directly connects the fifth rotation element with the seventh rotation element and the tenth rotation element,
the third rotation shaft directly connects the second rotation element with the sixth rotation element,
the fourth rotation shaft is directly connected to the third rotation element,
the fifth rotation shaft is directly connected to the eleventh rotation element and is selectively connectable to the input shaft,
the sixth rotation shaft directly connects the eighth rotation element with the twelfth rotation element, and
the seventh rotation shaft is directly connected to the ninth rotation element.

10. The planetary gear train of claim 9, further comprising:
a first clutch selectively connecting the first rotation element with the input shaft;
a second clutch selectively connecting the second rotation element with the input shaft;
a third clutch selectively connecting the third rotation element with the input shaft;
a fourth clutch selectively connecting the input shaft with the eleventh rotation element;
a first brake selectively connecting the sixth rotation element with the transmission housing;
a second brake selectively connecting the third rotation element with the transmission housing; and
a third brake selectively connecting the ninth rotation element with the transmission housing.

11. The planetary gear train of claim 10,
wherein a first forward speed is achieved by operation of the first clutch and the first and third brakes,
a second forward speed is achieved by operation of the first clutch and the second and third brakes,
a third forward speed is achieved by operation of the first clutch and the second clutch and the third brake,
a fourth forward speed is achieved by operation of the second clutch and the second and third brakes,
a fifth forward speed is achieved by operation of the second and fourth clutches and the third brake,
a sixth forward speed is achieved by operation of the second and fourth clutches and the second brake,
a seventh forward speed is achieved by operation of the first, second, and fourth clutches,
an eighth forward speed is achieved by operation of the first and fourth clutches and the second brake,
a ninth forward speed is achieved by operation of the first and fourth clutches and the first brake,
a tenth forward speed is achieved by operation of the fourth clutch and the first and second brakes,
an eleventh forward speed is achieved by operation of the third and fourth clutches and the first brake, and
a reverse speed is achieved by operation of the third clutch and the first and third brakes.

12. The planetary gear train of claim 9, wherein
the first planetary gear set is a single pinion planetary gear set, the first rotation element is a first sun gear, the second rotation element is a first planet carrier, and the third rotation element is a first ring gear;
the second planetary gear set is a single pinion planetary gear set, the fourth rotation element is a second sun gear, the fifth rotation element is a second planet carrier, and the sixth rotation element is a second ring gear;

the third planetary gear set is a single pinion planetary gear set, the seventh rotation element is a third sun gear, the eighth rotation element is a third planet carrier, and the ninth rotation element is a third ring gear; and the fourth planetary gear set is a single pinion planetary gear set, the tenth rotation element is a fourth sun gear, the eleventh rotation element is a fourth planet carrier, and the twelfth rotation element is a fourth ring gear.

* * * * *